G. P. EUSTIS.
LIQUID FUEL VAPORIZER.
APPLICATION FILED NOV. 9, 1920.
1,398,370.
Patented Nov. 29, 1921.
2 SHEETS—SHEET 1.
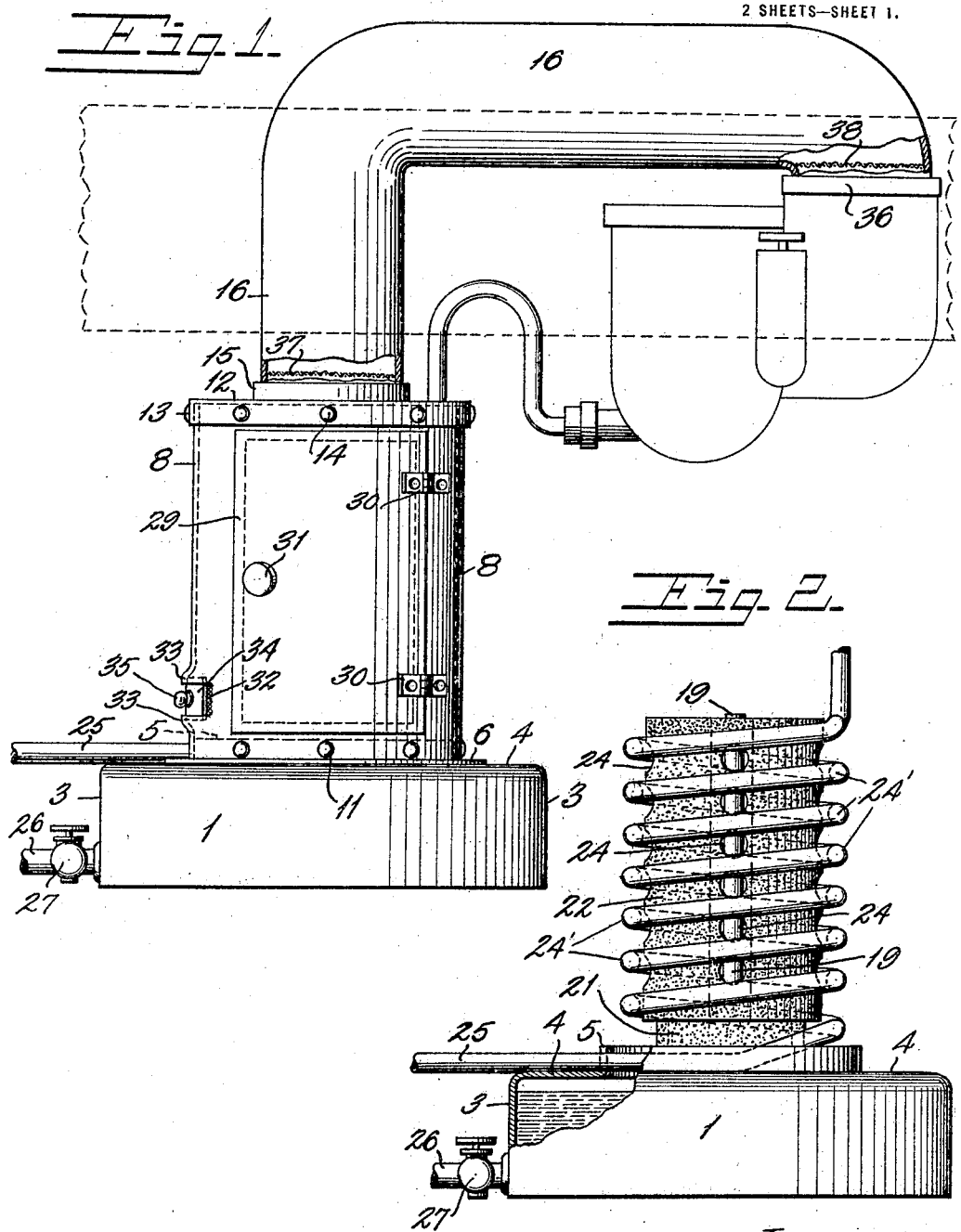
INVENTOR.
George P. Eustis,
By Semmes + Semmes
ATTORNEYS.

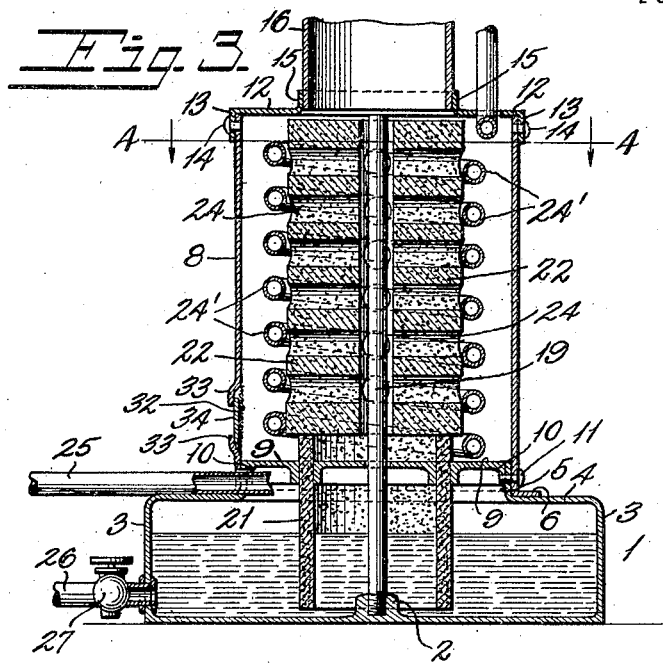
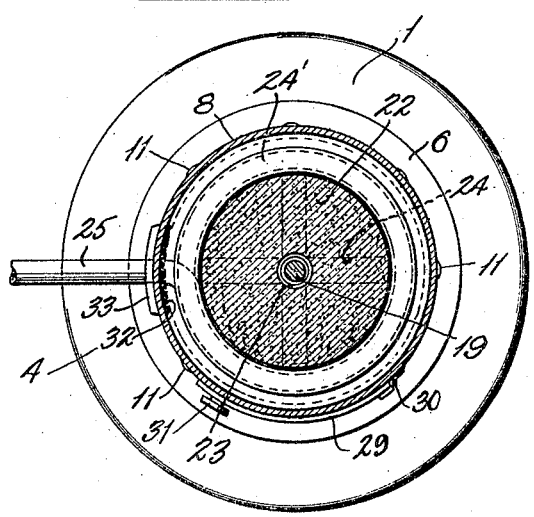
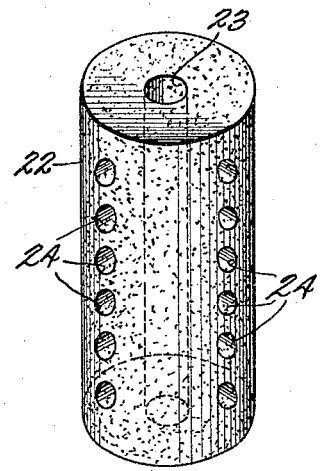

UNITED STATES PATENT OFFICE.

GEORGE P. EUSTIS, OF WASHINGTON, DISTRICT OF COLUMBIA.

LIQUID-FUEL VAPORIZER.

1,398,370.  Specification of Letters Patent.  Patented Nov. 29, 1921.

Application filed November 9, 1920. Serial No. 422,897.

*To all whom it may concern:*

Be it known that I, GEORGE P. EUSTIS, citizen of the United States, residing at Washington, District of Columbia, have invented certain new and useful Improvements in Liquid-Fuel Vaporizers, of which the following is a specification.

This invention relates to certain new and useful improvements in means for the vaporization of alcohol in internal combustion engines and it has particular relation to the use of such engines as are adapted for the propulsion of automobiles, and similar vehicles.

The present market price of gasolene is such that alcohol can compete with it in the open market as a fuel for internal combustion engines, if means can be found which will make it practicable to use it as a substitute therefor. In addition to this fact it is to be noted that it has many advantages over gasolene; it does not produce carbon in the cylinders of the engines, it gives out no disagreeable odor, and it is very much cleaner to use.

The use of alcohol for the purpose indicated has been tried many times but it has not so far resulted successfully both from a practical and from a commercial standpoint. The present high price of gasolene, however, has opened the way for its success as a commercial venture, if practical means can be found for its vaporization. One of the obstacles to its successful use is because of the fact that alcohol will not explode unless highly heated before it enters the carbureter and the presence of a continued flame for this purpose, has been found impractical for many reasons.

One object of my invention is to provide simple and effective means for heating the mechanism initially.

Another object is to provide a satisfactory heater which will obviate the necessity of a continued flame to heat the alcohol before passing it into the carbureter of the engine.

One of the materials to be employed for the heater, I have ascertained by experiments, must be of a substance which can be heated by the products of combustion to a high degree, and will be capable of maintaining its shape under such high temperature. Asbestos has been found a satisfactory substance for this purpose and this I fashion into a shell or cylinder provided with numerous apertures through which the heat may pass. The other ingredient which I have found necessary to be combined with the asbestos, to accomplish the object in view consists of metallic particles, such as particles of tin, aluminum, copper and platinum. Carborundum also may be used, although I prefer aluminum or copper to the other two. This cylinder constituting a heater or stove I inclose in a vessel or chamber, and heat by a flame for a short period, until it glows red, when the source of heat is shut off, and alcohol is permitted to come in contact with it. Under such condition, the state of red glow is maintained so long as the alcohol is supplied.

With these and other objects in view which may be incident to my improvements, the invention consists in the parts and combinations to be hereinafter set forth and claimed, with the understanding that the several necessary elements comprising my invention, may be varied in construction, proportions and arrangement, without departing from the spirit and scope of the appended claims.

In order to make my invention more clearly understood, I have shown in the accompanying drawings means for carrying the same into practical effect without limiting the improvements in their useful applications to the particular constructions, which for the purpose of explanation have been made the subject of illustration.

In the drawings:

Figure 1 is a side elevation of my device showing the same connected with the carbureter of an internal combustion engine, and showing the manifold in dotted lines.

Fig. 2 is a side elevation with the housing removed.

Fig. 3 is a vertical sectional view of the device.

Fig. 4 is a horizontal sectional view on the line 4—4 of Fig. 3, and

Fig. 5 is a detail perspective view of the heater.

The numeral 1, refers to a small tank or reservoir mounted upon the fore part of a chassis of an automobile, the bottom wall of which is provided with an interiorly screw threaded block or lug 2, for a purpose which will hereinafter appear. The side walls 3, of the tank extend upwardly and then converge toward one another for a short distance forming the upper wall or top 4, of the tank; they then turn upwardly again making a flange 5, thus leaving the greater portion of the top open.

Over the flange 5, and resting upon the top by means of the outwardly extending annular bottom portion 6, is a cylindrical casing or housing 8, and within the lower portion of said housing, is a base or bottom 9, with a turned down edge 10. This edge 10, a portion of the housing 8, and the upper flange 5, are all securely fastened together by means of rivets or bolts 11. The upper part of the casing 8, is provided with a cover 12 having a turned-down edge 13, fastened to the top by means of rivets or bolts 14. The top is apertured and the upturned edges 15 surround the bottom of the pipe 16.

Positioned upon the bottom of the tank and extending in a vertical plane is an upright or rod 19, screw threaded at its lower end, so as to fit, and be firmly seated within the screw threaded block 2, heretofore referred to. This upright extends through an opening in the bottom of the cylinder, and terminates at its upper end just above the top of the cylinder, its object is to position the stove or heater to be hereinafter described.

Located within the tank and extending up through an opening in the base 9, in the bottom wall of the cylindrical casing 8, is a circular wick 21, preferably of asbestos or other similar material. Above this and resting thereupon is a stove or heater 22. This stove is composed of a composition consisting of asbestos, or other similar material, and of small metallic particles of tin, aluminum, copper or platinum and other metals. The heater is of cylindrical configuration, and has a hole 23, extending through its longitudinal axis. Its sides are pierced with a series of longitudinal apertures 24, extending therethrough, as more clearly seen in Figs. 3, and 5, and it is made to fit over the upright 19, and to sit upon, and be in close physical contact, with the upper edge of the wick 21. The capillarity of the wick 21, will not only draw up into itself the fuel alcohol in the tank 1, but will communicate it to the heater 22, which being made of similar material, will by reason of its own capillarity, absorb from the wick and draw the alcohol up into and throughout its own body.

Within the housing 8, and exteriorly and closely surrounding the heater just referred to is a copper coil or pipe 24', which communicates at the bottom with a pipe 25, extending to the usual fuel tank (not shown) mounted upon the car. When said tank is filled with alcohol, the latter flows through the pipe 25 to and through the coil 24', and thence to the carbureter. A smaller pipe 26, joins the pipe 25, at some point before it reaches the copper coil, and through it the small tank 1, receives its supply of alcohol. There is a cock 27, located at or near the small tank, so as to properly regulate the supply.

The housing 8, is provided with an opening which is closed by a door 29, secured to the casing by hinges 30. On the door is located a knob 31, and latch (not shown) by which it may be tightly closed. To one side of the door, is shown an opening covered by a fine screen 32, on each side of which are guideways 33, for a slide 34, the latter having a knob 35. The slide moves in these guide-ways 33, and may be pushed back and forth, so as to increase or decrease the size of the opening.

Extending from the top of the cylinder is the pipe 16, heretofore adverted to, which traverses alongside the manifold for a portion of its length, and imparts heat thereto and its farther end communicates with the carbureter at 36. In this pipe, at the point 37, and also at the point 38, I locate a wire screen as clearly shown in Fig. 1, the purpose of which is to retard somewhat the passage of air, so that it may not lose its heat.

The operation of my device is as follows:—

The usual fuel supply tank of the car is filled with alcohol, this flows under the pressure of an air pump, or the so-called vacuum system, through the pipe 25 to the coil 24', and also through the feed pipe 26 to the small tank 1. To light the wick the door 29, of the cylindrical housing 8, is opened and the damper or slide 34, is likewise opened so as to permit of the passage of a current of air through the housing and the pipe 16, to the carbureter. I then apply a match to the wick 21, and the latter immediately ignites, the flame furnishing the heat to the stove or heater 22. When the stove 22 reaches the state of a red glow, it is not necessary that the flame should be further maintained, for the alcohol as it is sucked by the wick and through the wick into the stove burns immediately it touches the stove, heating the surrounding air, which passes up through the pipe 16 to the carbureter. The heat radiated from the stove is communicated to the surrounding copper coil 24', and the alcohol therein is so highly heated that upon its entrance in the carbureter, it readily evaporizes and is suitable for introduction into the cylinders of the engine.

While I have shown and described the preferred embodiment of my invention, I wish it to be understood that I do not confine myself to the precise details of construction herein set forth, by way of illustration, as it is apparent that many modifications and variations may be made therein, by those skilled in the art, without departing from the spirit of the invention, or exceeding the scope of the appended claims.

I claim:—

1. A method of burning alcohol without a visible flame which consists in causing the alcohol to be absorbed by a stove comprising a porous and mineral body, supplying oxygen thereto, igniting the body and maintaining a flame until the same is at a red glow, shutting off the supply of oxygen until the flame is extinguished, then admitting oxygen in sufficient quantities only to maintain the stove at a red glow and without a visible flame.

2. A method of burning alcohol without a visible flame which consists in causing the alcohol to be absorbed by a stove comprising a porous fire-resistent body and mineral particles, supplying oxygen thereto, igniting the body and maintaining a flame until the same is at a red glow, shutting off the supply of oxygen until the flame is extinguished, then admitting oxygen in sufficient quantities only to maintain the stove at a red glow and without a visible flame.

3. A method of burning alcohol without a visible flame which consists in causing the alcohol to be absorbed by a stove provided with a series of apertures and consisting of a porous fire-resistent body and mineral particles, supplying oxygen thereto, igniting the body and maintaining a flame until the same is at a red glow, shutting off the supply of oxygen until the flame is extinguished, then admitting oxygen in sufficient quantities only to maintain the stove at a red glow and without a visible flame.

4. A stove for burning alcohol comprising a porous fire-resistent material and mineral particles molded together and provided with apertures for the admission of air whereby alcohol may be burned without a visible flame.

5. A stove for burning alcohol comprising a porous fire-resistent absorbent material and mineral particles molded into a shell and provided with a series of apertures for the admission of air whereby alcohol may be burned without a visible flame.

6. A stove for burning alcohol consisting of a porous fire-resistent absorbent material and mineral particles molded into cylindrical form and provided with a series of horizontal apertures for the admission of air whereby alcohol may be burned without a visible flame.

7. A stove for burning alcohol consisting of a porous fire-resistent absorbent material and mineral particles molded into cylindrical form and provided with horizontal and vertical apertures for the admission of air whereby alcohol may be burned without a visible flame.

8. A stove for burning alcohol consisting of a porous fire-resistent material and copper particles molded into a shell and provided with apertures, whereby alcohol may be burned without a visible flame.

9. The combination with an alcohol lamp, and a stove composed of fire-resistent absorbent material and mineral particles molded together, of a wick in contact with the lamp and stove from which the stove receives a supply of alcohol through capillary attraction.

10. The combination with an alcohol lamp, and a stove composed of fire-resistent absorbent material and copper particles molded together, of a wick in contact with the lamp and stove from which said stove receives a supply of alcohol through a capillary attraction.

11. A vaporizer for alcohol engines comprising a stove consisting of porous fire-resistent absorbent material and mineral particles molded together, a wick in contact with a source of alcohol and the stove from which the latter receives a supply of alcohol through capillary attraction, a coil of pipe surrounding the stove and receiving heat therefrom through which coil alcohol is conveyed from a source of supply to the carbureter of the engine.

12. A vaporizer for alcohol engines comprising a stove consisting of porous fire-resistent absorbent material and mineral particles molded together, a wick in contact with a source of alcohol and the stove, from which the latter receives its supply of alcohol, a coil of pipe surrounding the stove and receiving heat therefrom, through which coil alcohol is conveyed from a source of supply to the carbureter of the engine, and a housing inclosing the stove and coil.

13. A vaporizer for alcohol engines comprising a stove consisting of a porous fire-resistent absorbent material and mineral particles, a wick in contact with a source of alcohol and the stove, from which the latter receives its supply of alcohol, a coil of pipe surrounding the stove and receiving heat therefrom through which coil alcohol is conveyed from a source of supply to the carbureter of the engine, and a housing provided with a door and a damper inclosing the stove and coil.

14. A vaporizer for alcohol engines comprising a stove consisting of a porous fire-resistent absorbent material and mineral particles molded together, a reservoir for alcohol upon which said stove is mounted, a wick in contact with the alcohol and with the stove, from which the stove receives its supply of alcohol, a coil of pipe surrounding the stove and receiving heat therefrom, through which coil alcohol is conveyed from a source of supply to the carbureter of the engine and a housing inclosing the stove and coil.

In testimony whereof I affix my signature.

GEORGE P. EUSTIS.